United States Patent [19]
Bell

[11] 3,808,030
[45] Apr. 30, 1974

[54] WOOD PLASTIC FABRICATION METHODS AND PRODUCT
[75] Inventor: Belmere V. Bell, Philipsburg, Pa.
[73] Assignee: Atlantic Richfield Company, New York, N.Y.
[22] Filed: Mar. 9, 1972
[21] Appl. No.: 233,369

Related U.S. Application Data
[63] Continuation of Ser. No. 770,034, Oct. 23, 1968, abandoned.

[52] U.S. Cl................. 117/64, 117/93.31, 117/136, 117/148, 117/161 R
[51] Int. Cl............................................... B44d 1/50
[58] Field of Search....... 117/136, 148, 161 R, 93.1, 117/64, 93.31; 52/323

[56] References Cited
UNITED STATES PATENTS
3,579,410  5/1971  Barrett........................... 115/148 X
3,565,679  2/1971  Strother......................... 117/148 X
3,429,733  2/1969  Wolf et al...................... 117/136 X Primary Examiner—Edward G. Whitby
Attorney, Agent, or Firm—John R. Ewbank

[57] ABSTRACT

A process for fabricating a wood-plastic composite product including improvement features associated with assembling wood pieces into unitary multi-piece units, before or after impregnation and irradiation operations; selection of impregnant materials and associated methods of impregnating and irradiating the wood pieces to optimize the treatment and to minimize attendant problems, such as laking, and associated finishing techniques.

5 Claims, 6 Drawing Figures

WOOD PLASTIC FABRICATION METHODS AND PRODUCT

This is a continuation of application Ser. No. 770,034 filed Oct. 23, 1968, now abandoned.

PROBLEMS, INVENTION FEATURES

Some workers in the art of creating wood-plastic composite (WPC) products, may be familiar with materials and associated techniques whereby voids in the wood are (at least partly) filled with an impregnant including a monomer, the polymerization of which is initiated "in situ" by gamma radiation. The resulting composite product can retain many of the desirable properties of the wood, while exhibiting improved properties associated with the polymer (depending on the concentration thereof present in the wood), such as improved toughness, hardness, durability, bending strength and the like. Fabrication of such WPC composites can present certain problems. One problem is associated with treating WPC pieces individually and thereafter assembling them into a composite multi-unit form, such as a flooring tile. For instance, this may involve the unnecessary expense and treatment time involved in treating pieces that are defective as to their wood construction or as to their assembly. The present invention is directed towards alleviating such problems by specifying a preassembled WPC unit for treatment, together with associated treating techniques.

Another problem associated with WPC treatments is that of "laking," whereby impregnant material occludes to the surface of the pieces during irradiation, often spoiling them. The present invention is directed toward a WPC assembly technique especially adapted for use with impregnant materials and associated treating techniques which minimize laking and other treating problems such that inspection prior to treatment can eliminate most rejects.

Thus, it is an object of the present invention to alleviate such problems, and especially to provide improved techniques for fabricating woodplastic products with impregnation and gamma radiation treatments. A related object is to provide such techniques for multi-unit WPC assemblies by preparing and assembling the units into the assemblies for treatment operations. Another object is to provide such techniques using impregnants which include vinyl type monomers or the like, and preferably methyl methacrylate; preferably also in conjunction with a compatible dye in a concentration of a few percent plus a compatible fire retardant. Yet another object is to provide such techniques including the impregnating of wood pieces; and the irradiation and surface finishing thereof according to improved methods. These and other objects will become evident from the following specification and claims.

The drawings wherein like reference symbols denote like elements comprise:

FIG. 1 a schematic bottom perspective view of a plurality of wood-plastic pieces assembled into the form of a single unitary floor tile, and adapted to be treated to fabricate a WPC product according to the invention, one of the pieces being exploded away and turned over;

DETAILS

The fabrication of typical wood plastic composite products will now be described in the logical order for typical operations, with associated materials, problems and operational parameters, being discussed at the appropriate juncture.

WOOD PREPARATION

Figure 5:
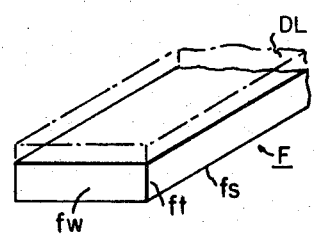
FIG. 5 is a fragmentary perspective of a single wood piece of the type indicated in FIGS. 1 and 2.

Wood selection will generally be determined by asthetics, for instance, dictated by the shade and graining desired for the finished product, consistent with the proper cost, availability, etc. Almost all forms of wood can, in one way or another, be placed in proper condition for a "WPC treatment," i.e., impregnation and irradiation to render a wood-plastic composite (WPC) product. It should be understood that the density and pore size of the wood selected will strongly affect the impregnating treatment (e.g., loading efficiency, as discussed below). Also, moisture content should be controlled, such as by controlled kiln drying and humidifying during shipping, storage, etc. For instance, Red Oak suitable for WPC treatment will typically have a moisture content of about 7-9 percent (preferred range), such as when cut in the form of "finger-boards" (fillets). Below about 5 percent moisture content, Red Oak will tend to shrink; while above about 10 percent, it will tend to swell. Thus, for example, in using Red Oak wood for treatment, the cut lumber will be dried to about 8 percent moisture preferably (in kilns, after having been trimmed). Such fillets are schematically represented at 10-1 in FIG. 1 and at F in FIG. 5. Moreover, 8 percent is a common standard (equilibrium moisture) for flooring.

A wide variety of commonly avilable woods species are appropriate for WPC applications. For instance, although the invention was found especially advantageous for use with Red Oak fillets impregnated with methyl methacrylate, MMA, as described herein, MMA also appears readily adaptable for impregnating other commonly available species, such as White Oak, Spruce, Yellow Poplar, Sugar Maple, White Pine, Beech, Birch, Mahogany, and Locust. Of course, the weight of the monomer impregnated can vary, for instance, from about 40 percent to about 120 percent of the original wood weight, depending on the type of wood used. Usually the polymer will be evenly distributed throughout the wood structure; however, in some species, the heartwood and sap wood differ in "monomer uptake" (e.g., in Walnut, Beech, Red Pine and Cherry). "Open Structure" woods such as Maple and Birch appear to have no such "uptake differential"

characteristics, although these woods are more expensive. Resinous and "hard-to-penetrate" heartwoods, including Oak and many varieties of Pine, present other difficulties. For instance, the openings between the cells of White Oak appear too small to allow an efficient, effective penetration of the monomer. Lower grade woods are generally soft and contain greater quantities of sap, tannin and gum which can cause nonuniform impregnation, poor appearance and exhibit less structural strength. More importantly, soft woods typically absorb on the order of 1.1 pound of monomer per pound of wood, compared with about 0.7 pounds absorbed by hardwoods.

The form into which the wood is placed for the WPC (impregnation and irradiation) treatment will depend to an extent upon economics and, for instance, may comprise a solid block of wood, or a stacked array of fillets or an assembly of fillets, formed into one or several integral "tiles" by various means discussed below. In any case, the raw wood will typically take form of boards, which should be inspected, and defects (such as knots, etc.) cut out in a trimming saw operation. Such a trimming may typically yield about 122 usable sq. ft. from 1,000 board feet. The trimmed boards may then be cut into blocks suitable for fitting into the treatment containers, the blocks first being fed to a planer to be rough-finished. Such blocks may then be placed in the impregnant container as discussed below to be impregnated and thereafter irradiated.

However, it may often be preferable to first subdivide these blocks into small smooth finger boards (fillets), for instance, about 6 inches by 7/8 inch by 5/16 inch. This may be performed by planing the blocks to a thickness determining the width of the fillet and then cutting out the fillet lengths and widths with a gang saw. The fillets are then suitable for stacking in containers for impregnation and irradiation, as indicated below.

However, according to an improvement feature of this teaching, we have found it preferable in these cases to assemble a number of these fillets into a unitary tile and treat (e.g., impregnate, irradiate, finish, etc.) the tile rather than the fillet. An example is tile 10 in FIG. 1 comprising seven joined fillets, 10-1 through 10-7. Various means may be used for fastening the fillets together, such as edge-bonding (glueing), adhering them to a common backing (discussed below), or mechanical fastener means. A particularly suitable form is illustrated in the form of a pair of spline wires joining the fillets to form tile 10. Glue-bonding will be strongest where fillet pores are the least filled (see below, and also Report by University of W. Virginia to Atomic Energy Commission, DID: "ORO-2945-5;" July 1966, for details).

Figure 1:
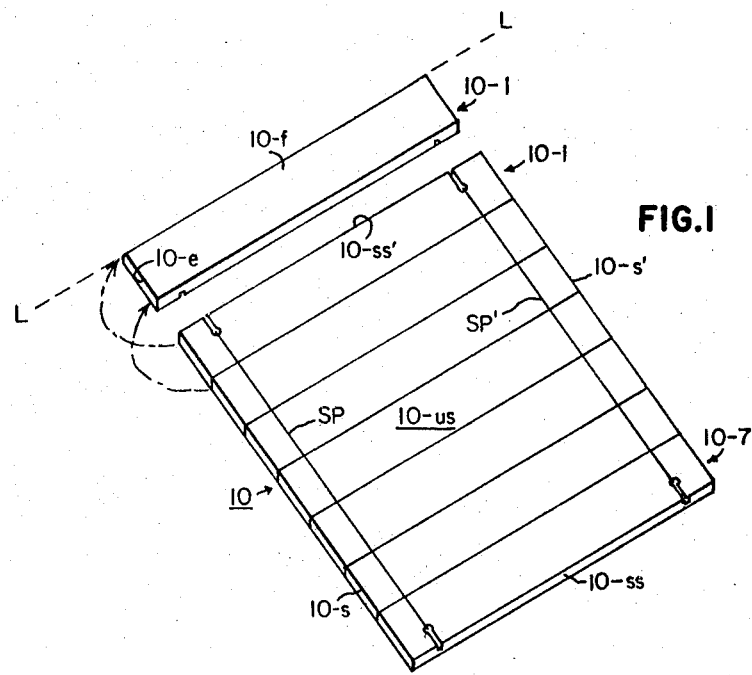

Workers in the art will recognize that various handling apparatus may be used to automatically assemble and align the prescribed number of fillets to form such a tile. Such apparatus may also perform related operations like edge finishing (e.g., tongue and groove forming, etc.), trimming the panel to obtain precise dimensions, forming bevels on the underside edges to provide mastic-accepting grooves, and the like. The apparatus for assembling and joining fillets should also provide for a specified controlled adjustable clearance between fillets, such as the (8 mil) clearance between fillets of the tile indicated in FIG. 1. This will accomodate the swelling to be expected in use and accomodate treatment and bonding operations. Fastening may be then performed, where applicable, such as by embedding splined wires $sp, sp'$ across the fillets spanning the width of tile 10, preferably cutting off their ends and locking them inset in place as indicated in FIG. 1 in a punching operation. Of course, one may use any number of such wires; however, it has been found that a pair fastened in the indicated manner are suitable for forming a 6 inch by 6 inch floor tile, something understood by workers in the flooring art as a convenient dimensional module. Thus, tile 10 may be understood as viewed from its underside (fastening side) and as having a pair of width edges 10-$s$, 10-$s'$, these edges preferably being 6 inches long and cut square and smooth (e.g., for butt-joining with other tiles for laying a parquet floor). Alternatively, the edges may comprise various interlocking configurations known in the flooring art, such as "tongues and grooves." Tile fillet 10-1 in FIG. 1 is shown exploded away from tile 10, and turned over, with its elongate axis aligned along axis L—L, also the grain direction (fibre alignment). Each fillet may be understood as having a smooth-finished face 10-$f$ (the working surface).

Figure 2:
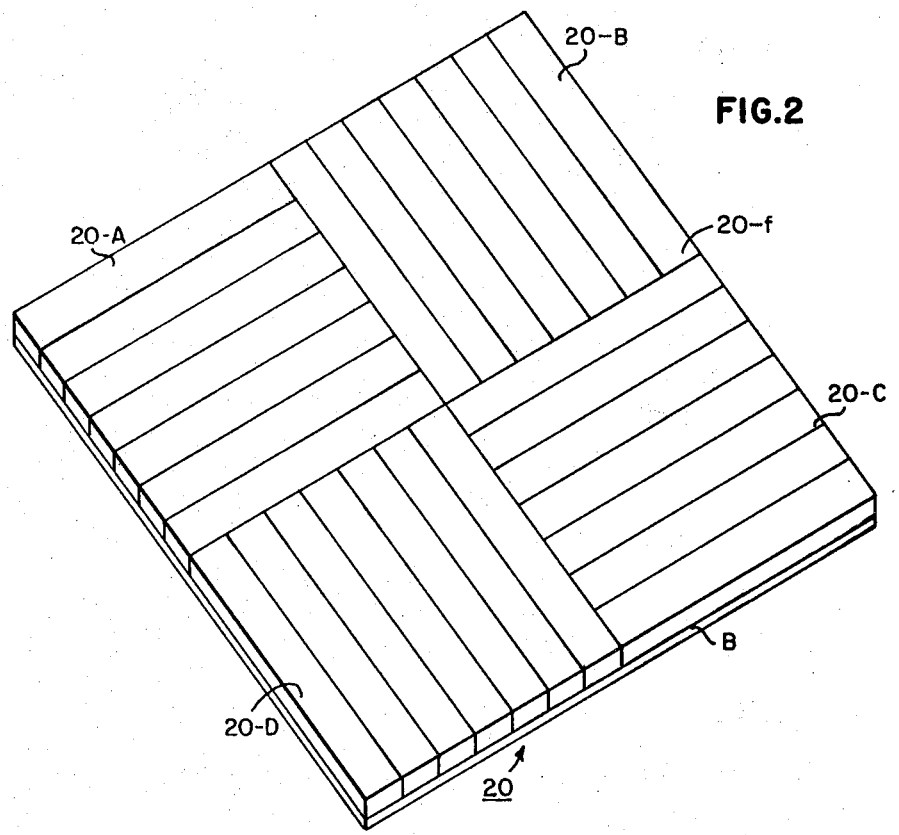
FIG. 2 is an upper perspective view of four tiles of the type indicated in FIG. 1 assembled together on a common backing to comprise a single unitary panel.

In some cases, it will be preferable to assemble a number of such tiles to form a single integral "panel" and treat the panel. Thus, a plurality of such tiles are shown fastened together into a single unitary panel 20 in FIG. 2, comprising tiles 20-A, 20-B, 20-C, and 20-D, each tile being substantially like tile 10 in FIG. 1, except for the fastening means, as indicated below. Of course, any number of suitable tiles may be joined to comprise such a panel. The panel will be especially applicable for conventional flooring applications, as with analogous panels of wood, plastic, elastomers, or the like. For instance, joining four 6 inch by 6 inch tiles into the panel indicated will yield a 12 inch by 12 inch panel conforming to a dimensional module useful in the flooring art. Composite panel 20 is thus comprised of four sets of seven adjacent fillets, the sets arranged in orthogonal adjacency to present a common coplanar finish face 20-$f$ on one side and to be bonded together by suitable fastening means. One such means, found suitable for many purposes, comprises a common backing B, indicated in FIG. 2. One form of such a backing comprises an asphalt-impregnated "asbestos paper" bonded securely to the underside of the panel, such as by coating the panel and backing with a polyvinyl acetate (PVA) emulsion mastic. An important consideration, as indicated below, is that the backing material, and especially the associated adhesive, be relatively stable and inert in the presence of the impregnants and the treating steps. For instance, some impregnant monomers like MMA dissolve many adhesives.

According to an alternate treating process, such panels are made by first treating individual fillets (as further described below, by impregnating and irradiating them); then assembling four sets of seven fillets in the orthogonal relation indicated (such as with automatic handling and aligning equipment known in the art); and finally adhering a backing to the underside to form a panel. Such a treated, assembled panel may then be "finished" by dressing its face according to a suitable finishing schedule (e.g., that indicated below).

The mechanical fillet-fastening of FIG. 1 is preferred for certain applications, especially since, unlike many backings, and associated adhesive materials, mechanical fasteners, like spline wires $sp, sp'$, will not adversely interact with impregnating-irradiation materials during, or after, treatment. Further, these wires are adapted to incorporate a certain degree of flexibility into the tile, allowing it to be smoothly bent, to an extent, along the "spline direction" (direction of fillet width) and thereby accommodate a certain amount of normal fillet expansion, subfloor-unevenness, etc., without buckling or protruding upward unduly. "Tongue and groove" interfitting of tiles, as laid, also allows for subfloor anomalies. The present spacing between fillets will also accommodate some normal swelling and should thus be carefully controlled. To best allow for swelling or other expansion, it will be understood as preferable to lay such tiles "cross-wise" where possible; i.e. with ends facing sides, as illustrated on the panel in FIG. 2, not "end-to-end," or "side-to-side." This, of course, best distributes any expansion in both directions across a floor area. Other analogous mechanical fastening techniques will be contemplated such as stapling, end-splining, edge-fastening and the like. Of course, in some instances this pre-assembling technique may not be very advantageous. For example, it is highly advantageous with radio-induced polymerizing treatment techniques like those described herein because it was found that, typically, the large majority of rejects stemmed from causes associated with wood selection and fillet assembly, the treatment itself having very high yields. However, where the yield from the treatments following fillet-assembly are not particularly favorable (e.g., very high yield up until the treating phase, very low thereafter) it may not be particularly advantageous to use this pre-assembly technique. Likewise, in certain instances the mechanical fastening technique may not be especially advantageous, such as where fillet-assembly is performed after fillet-treatment. Of course, the techniques of the invention are especially useful in association with radio-induced polymerization of the type described.

Workers in the art will visualize other analogous backing materials and associated adhesives. Another backing comprises a polyethylene sheet; however, care must be taken in selecting a compatible adhesive, especially in the presence of certain impregnants. Polyethylene has good strength, is inert, has good dye absorption, and can afford a moisture-barrier valuable in flooring applications. A modified backing would comprise one, or several, layers of cloth (e.g., "sack cloth" or the like), with or without an organic impregnant or laminate (e.g., polyethylene to guard against moisture penetration or the like), or a fiberglass mesh.

According to an improvement feature of this disclosure, such a backing may be formed to include a metallic foil, such as aluminum foil a few mils thick and preferably laminated to a paper (e.g., Kraft paper or the like, with a strong compatible adhesive) on one or both sides. Such a metallic foil (laminate) backing offers several advantages in flooring panels of the type described. For instance, it forms a very useful "moisture barrier" against the entry of subsurface water (the great enemy of any wood floor); also, it forms a barrier against laking effluents; further, it improves the appearance of the panel undersides and provides high wet-strength during processing. One of the most useful forms will comprise a 3.5 mil aluminum foil laminated, on one side, to a high-wet-strength paper. An analogous form will comprise a 2.5–3.0 mil aluminum foil laminated on both sides to thin paper stock.

Various means of fastening WPC products, to themselves and to another material (such as a substrate), will be contemplated by those skilled in the art. Mechanical fasteners, such as conventional wood screws, bolts and threaded fasteners, appear to perform quite satisfactorily in fastening WPC. For instance, it will be found that ordinary wood screws may be used with WPC material. Threaded inserts have also been found satisfactory and appear to have a higher "fastener holding power" that is many times higher than untreated wood. Using a hard polymer in WPC will give a better fastener holding power than with a rubbery, elastomeric polymer. It will be understood that WPC materials present a somewhat different fastening problem than untreated wood, in that while their tensile and compressive strengths are quite high, their shear strength is relatively low. For instance, WPC combinations cannot be nailed successfully, unless the polymer loading is quite low.

WPC materials may also be fastened with adhesives. In fastening WPC pieces together, such as to comprise the tile or panel aforedescribed and illustrated, a gluing operation may be performed before the impregnation-irradiation treatment (a backing may also be glued on them). However, care must be taken that the monomer and other impregnant constituents, as well as the irradiation treatment, do not adversely inter-act with glue constituents. For example, some glue constituents may be expected to aggravate the laking problem. Thus, it is preferable, when gluing WPC pieces together to do so after the irradiation operation. Various commercially available adhesives will be satisfactory for this. Resorcinal based adhesives will give very good results. Polyvinyl acetate and urea-formaldehyde casein adhesives will form satisfactory glue bonds with WPC pieces as long as the polymer loading of the WPC is not too high. Also, a WPC with a lower moisture content appears to form a better glue bond with these adhesives; thus, in the optimum case, the adhesive would be formulated with a moisture diffusion rate matching that of the WPC.

Forming the wood as aforementioned into a block or fillet and "treating" it in that form, at first appeared to be the straight forward, desirable way of fabricating the WPC product. However, according to an important feature, and surprising to relate, we have discovered it to be considerably more advantageous, in the usual case, to "treat" a pre-assembled group of fillets ("as-assembled" into a tile or panel), as opposed to treating the fillet and assembling it after irradiation. This has been especially advantageous when using the "improved treating processes" according to the features described below. Such a technique is an improvement which has greatly reduced — in certain cases virtually eliminated — such problems as laking, depletion, and the like. It has appeared that, with the preferred treating schedule, the bulk of the tile defects stem from wood imperfections and deviations in (tile or panel) assembly. Thus, it is evident that such a "tile-treating" technique can afford savings in treating time and expense if the assembled fillets are inspected prior to treatment and only "good" tiles are "treated" — the "rejects" being discarded before the treating stage. It has been found in practice that as much as 90–100 percent of the "post-radiation" rejects may thus be eliminated. Thus it is a salient feature of this teaching to form pre-assembled tiles for use as a "treating subject,"

(i.e., impregnation, irradiation, and finishing "as-a-tile" — not "as-a-fillet").

TREATMENT FEATURES GENERALLY

Figure 3:
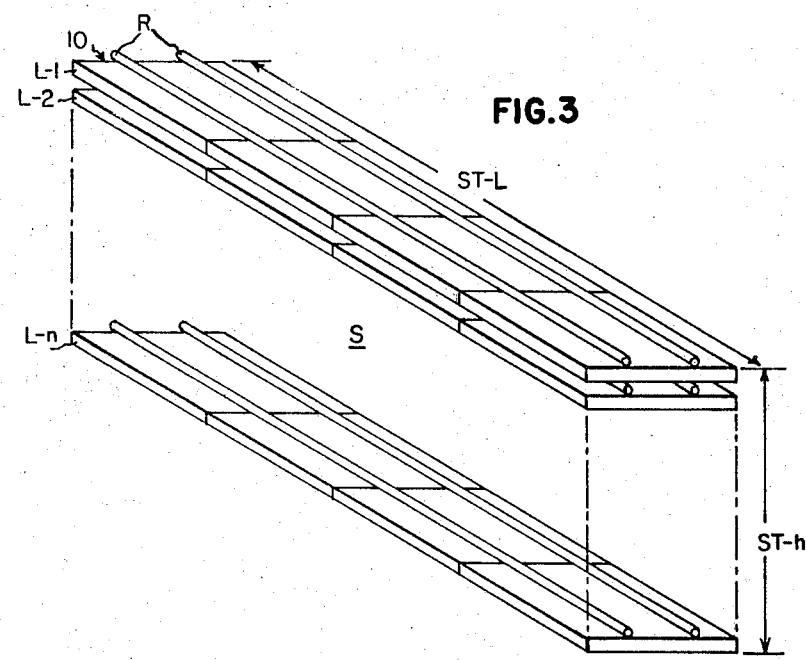
FIG. 3 is a very schematic perspective view of an array of wood pieces stacked in a prescribed manner for impregnation and irradiation, with prescribed separator means arranged between stacked layers.

The process and apparatus features of the impregnation and irradiation treatments will now be rather generally and examplarily described, along with attendant problems, such as laking and depletion. Turning to impregnation, and averting particularly to FIG. 3, this process will be illustratively described in terms of impregnating a plurality of superposed, separated layers of fillets, such as layers L-1 through L-$n$ in FIG. 3, stacked to a prescribed height, $St$-$h$ (about two dozen layers high). These fillets are examplarily shown as formed into (seven-fillet) tile units; although, of course, other forms may be treated, such as individual fillets laid adjacent across each layer. For purposes of indicating the problems associated with impregnation and the associated remedial steps, it will be assumed that illustrated spacer rods R are omitted for the present purposes and that the fillets lie in vertical superposed adjacency to form an "impregnation stack." It will be understood that stack S, of prescribed height $St$-$h$ and length $St$-L, thus involves a prescribed number of fillet layers L-$n$ and is dimensioned to be accommodated in a prescribed impregnant magazine C (or "wood can," not shown in FIG. 3, but indicated in phantom in FIG. 4 — see four cans C-1, etc., indicated within the cutout in irradiation canister 30.) For purposes of illustration, each magazine C will be assumed to receive a prescribed stack S and the associated number of fillets (tiles) of the type indicated. An examplary stack comprises 24 square feet of tile. Four such magazines are to be loaded together into an impregnator vessel for pressurized introduction of the impregnant therein.

To start impregnation, this vessel will then be evacuated. In this example a vessel about 12 inches in diameter is evacuated to about 10 millimeters Mercury pressure, and kept there for about 45 minutes (assuming Red Oak fillets of the type described with respect to FIG. 1 are involved). The impregnant will then be introduced to immerse the fillets completely; in this example being pressurized with a Nitrogen atmosphere at about 80 psi. for about 2 hours (or less in certain cases), until "saturation" of the fillet is substantially complete. The process gas should be nitrogen or a similar inert atmosphere without oxygen, since oxygen inhibits the radiation polymerization reaction. In certain cases, (such as with the separator rods described below), satisfactory impregnation may occur within the order of 30 to 60 minutes. It may be assumed, for illustrative purposes, that the impregnant here comprises a mix such as indicated in Example 1 below, and that the tiles are to be fabricated into flooring tiles (or panels).

The pressure will then be reduced and the mix drained from the vessel. The cans may then be removed to be taken to the irradiator. A typical can of Red Oak fillets as aforedescribed weighs about 27–30 pounds before such impregnation could typically increase in weight to the order of 40–55 pounds as a result of introducing the impregnant. While vacuum forces were indicated as employed to introduce and to eject the impregnant in the foregoing process example, workers in the art will understand that steam injectors and/or other impregnator processes and equipment known in the art may be substituted. Of course, a different type of wood and/or a different type of impregnant will require a different characteristic impregnator schedule. It was found that the theoretical maximum loading TML, will vary inversely with the density of the wood and that this factor, as well as the "percentage theoretical maximum loading" (PTML), is a good parameter for assessing impregnation efficiency. While the described "in-depth" impregnation will be of high advantage in many applications, especially where inservice wear of the surface might be a problem (e.g., with flooring), in others a mere surface impregnation, or other selective impregnation, may suffice. Advantage may be taken of the fact that impregnant is more readily absorbed at the "end-grain" of wood pieces by providing a heavier loading there (e.g., for reinforcement of pieces against splintering).

Figure 4:
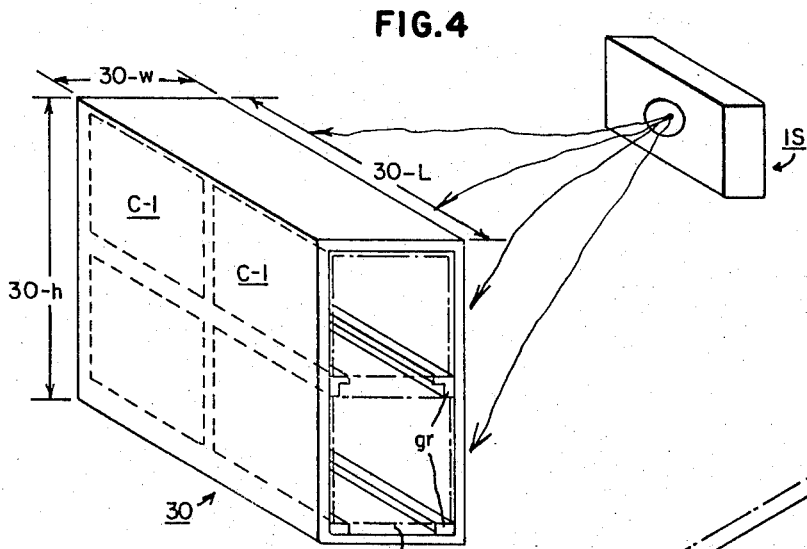
FIG. 4 is a side perspective view of an irradiator vessel and source, schematically indicated, the vessel being partly broken away to reveal a number of containers, each including a stack of wood pieces such as the stack in FIG. 3.

The irradiation process will now be described according to the foregoing illustrative subject (stack in FIG. 3 in can C. impregnated and drained), and averting particularly to the showing in FIG. 4 of an examplary irradiator canister 30. Canister 30 will be understood as accepting four of the aforedescribed type wood cans C to be subjected to a prescribed amount of polymerizing irradiation, indicated schematically as emanating from a suitable known gamma irradiation source, IS. Canister 30 will be understood as suitable for use in a "pool type" irradiator and as sealable with a cover (not shown) to be water-tight. For this example, the canister will measure about 5foot x2foot x7inches with walls of 1/4 inch stainless steel or the like. Two of these impregnator cans are inserted along each upper, and each lower, track in canister 30. As indicated in FIG. 4, each track comprises a pair of spaced ways grain prescribed alignment, with a prescribed bottom cavity CV provided under the lower track. Cavity CV is adapted for receiving effluent absorbing material, as indicated below.

It will be understood that the pool irradiator arrangement in the example comprises a tank about 26 feet deep or more (by about 50 feet x 22 feet in section) filled with water. On the floor of the pool is situated an irradiator unit such as an "NEPI"-unit or an "NPI" unit (source units by NUMEC, 100,000 curies of cobalt-60, comprising about 58 37 inch pencils arranged in a plaque 5 feet by 3 feet), or a source unit providing equivalent gamma radiation. This irradiator arrangement will operate at ambient pressure and temperature and will also include handling means for lowering the canister to the proper pool depth and orienting it properly within the zone of irradiation from the source unit. The handling means may comprise a cable and hoist arrangement with opposed guide rails for guidingly engaging studs on the canister to guide it into the prescribed irradiation zone, without striking the source unit. Of course, other types of irradiator arrangements may be employed, as understood by those skilled in the art.

In the instant example, the canister is first preferably flushed several times to purge it of oxygen (several nitrogen flushings at about 5 psi.). The cover is then sealed and the canister lowered into the water to the irradiation zone (here understand at about 26 feet underwater), indicated schematically by the irradiation arrows from source unit IS. With one side of the canister close to the source capsule (e.g., the nearest fillet about 1 to 2 inches from the capsule), it is kept in position for about 3 hours 15 min. (assuming Red Oak fillets of the type aforedescribed and impregnant of the type used in the Example 1 below) for a dose on the order of 0.75 MRAD. The canister is then reversed so that its opposite side faces the source for a similar dose, over a 3 hour 15 minute period. Thus, the illustrative irradiation schedule involves a total dose of 1.5 MRAD at about 0.25 MR/hr. (about 6.5 hours) with the indicated irradiator arrangement. (Max./min. ratios of 1.15, inner, outer can positions; or 2.8 for single paths).

It has been found that dose rate as well as the percentage loading (that is, the percentage of the open voids in the wood which are filled with impregnant), can effect the heat generated during irradiation, as well as producing attendant effects. For instance, it has been found that reducing the dose rate from a level of about 0.2 – 0.3 MR/hr. to a level of about 0.05 MR/hr. (e.g., over about 20 hours) in an arrangement like the aforedescribed, gave a decrease in "laking" (described below) such that the fillet "yield" increased from about 50–70 percent to the order of 80–90 percent. Generally speaking, the doseage required to convert a monomer to a polymer varies with the square root of the radiation dose rate. However, this is modified in WPC irradiation by the need for an inhibitor and by the presence of inhibitor impurities, of wood resin, of oxygen and of other impurities in the monomer or in the treating environment. The doseage requirement for complete polymerization within the wood will be determined by such factors as: The species and condition of the wood; the type and concentration of monomer; the presence of impurities (e.g., oxygen) in the impregnant, in the wood or in the irradiation environment; and the use of irradiation activators. Of course, workers in the art will understand that other equivalent irradiation means can be employed, given appropriate adjustment for conditions. For instance, a different source for gamma irradiation (e.g., Cesium-137), may be used, being adjusted, such as in exposure time, to allow for difference in penetrating and polymerizing power, (to arrive at equivalent curie strength and MeV. energy level). Also such irradiation may, in certain cases, be provided by suitable Accelerator apparatus. Gamma irradiation may also be employed together with the more common polymerizing means such as heat, chemical catalysis and with activators and the like.

A number of parameters have been noted with respect to the impregnating cycle. An increase in wood density (or a decrease in pore size) can radically decrease the percentage loading of impregnant, as well as its time and efficiency of loading. For instance, using Oak fillets with a density of about 0.5–0.8 (Red Oak in the lower end of this range), percentage loading would vary from 32 percent to 65 percent. Further, it appeared that a change in pressure, with pressurizing time kept constant, did not significantly vary the percentage loading; indicating, evidently, that pressurizing changes do not reduce the vaporization of the impregnant monomer (MMA tested). Further, it was found that increasing pressurizing time, with pressure kept constant, increased the degree of "loading," up to a saturation point, which for Red Oak fillets at about 80 psi., occurred after about one-half hour.

Figure 6:
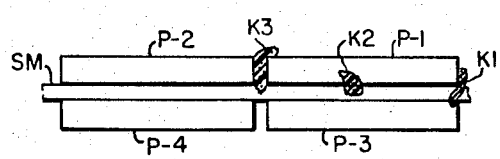
FIG. 6 is a schematic end view of adjacent corner portion of four tiles of the type indicated in FIG. 1, stacked and separated after the manner of FIG. 3, with the results of "laking" schematically illustrated.

A prime problem associated with the aforegoing impregnating and irradiating steps, appears to be "laking;" that is, a "bleeding" of impregnant mostly monomer, such as methyl methacrylate, MMA). Typical results of such laking are indicated schematically in FIG. 6. Here an illustrative set of four tiles, $p$-1 through $p$-4, viewed in cross-section, are arranged in close adjacency, but separated (eg. by separator rod SM, indicated in phantom). These tiles are only fragmentarily shown (at their adjacent corner portions) and may be understood as taking the form generally indicated with respect to FIGS. 1 and 3. The tiles will be understood as having been impregnated and irradiated according to techniques like those aforedescribed. It will be understood that, here, monomer material has occluded on the surfaces of various tiles and assumed the form of "laking globs" $k$-1, etc., clinging between adjacent tile surfaces. This material has hardened and/or polymerized there and can readily form the indicated "bridging" as with globs $k$-1 and $k$-2 (leaking from the end, and midsection, respectively, of tile $p$-1 to touch the tile $p$-3, hardening between the two); and $k$-3, leaking off the end of tile $p$-2 to touch tile $p$-1 and hardening there between. It will be evident that such material must be broken away, if possible, and that in any case, it often spoils the appearance and/or the functional utility of the subject tile. Of course, when such laking (and/or a surface depletion) spoil only the end of a fillet, an end-trimming operation can be performed after irradiation.

Another problem found to be associated with such impregnating and irradiating treatments is "surface-depletion," that is, a deficiency of impregnant material adjacent fillet surface areas, whether on the ends or the sides. It is not certain what causes such depletion or what alleviates it. However, it has been found with processes such as the aforedescribed wood fillet treatments and using impregnants such as those to be described below (in Example 1, etc.), that surface depletion is radically reduced. It is theorized that a low dose rate and a low processing temperature contribute toward reducing depletion. The underwater irradiation environment also appears to be contributing. Another problem associated with this application is that of backing adhesives and maintaining them stable in the face of certain impregnating monomers which, like MMA, are often very excellent solvents for many adhesive constituents.

The radio-induced polymerization of the above described treatment will be understood as causing the monomer molecules to become linked throughout the wood, forming a network of polymer that envelopes wood cells, encasing them tightly within a seal of plastic. Radiation-induced-polymerization, like conventional polymerization, proceeds by a free radical process, but does not require the addition of either heat or catalyst. Absorption of radiation energy by the monomer molecules results in the production of free radicals. These free radicals attach to a double bond of a monomer molecule, thereby generating another free radical. This process proceeds until the growing polymer chain is terminated or the radiation is removed. Because radiation in effect acts as catalyst, it offers a method of controlling the exothermic polymerization reaction within the wood substrate, a control which would be difficult to achieve with conventional polymerization techniques employing catalysts and heat.

It will be understood that such radio-induced polymerization affords a number of advantages over Thermal-catalytic Techniques, such as: extending monomer pot life, avoiding the inhibitory inter-action of some wood resins with catalysts: avoiding the long curing times and elevated temperature typically associated with conventional polymerization; and dangers of uncontrolled polymerization and of catalyst residue.

IMPREGNANT MATERIALS

At the outset, vinyl monomers appeared to be likely candidates for impregnating wood fillets like those aforedescribed. It has developed that poly (methyl methacrylate), i.e., MMA (polymer grade, loaded in the range 40–50 percent of initial wood weight) is preferred for this purpose, especially for flooring applications; and in conjunction with a suitable inhibitor and with a fire-retardant, a dye, and various other additives, as indicated in the Examples below. MMA is readily available and easily polymerizable. A preferred inhibitor for MMA is Butylate Hydroxide Toluene (BHT) at 35 ppm., although others will occur to those skilled in the art. An activator may also be appropriate. Other vinyl type monomers will be suitable for certain applications. For instance, poly(acrylates) are attractive for some applications because of their elastomeric properties. For instance, ethyl acrylate co-polymers with vinylidene chloride, or with acronitrile, will be quite suitable for many purposes. Acrylonitriles and Styrenes are also suitable monomers for some applications, and may even produce some grafting to the wood, thereby improving dimensional stability; however, they must be "fire-retarded" (unfortunately they burn rather readily) Styrenes will require relatively large radiation doses (about 20 times that for MMA). Vinyl chloride is an atractive monomer due to its low cost; however, it presents handling properties, since it typically has a rather short shelf-life and occurs as a volatile gas at atmospheric pressure, thus requiring cumbersome pressurization, heavy-duty vessels, etc. The above monomers may also be mixed with MMA under proper conditions. To reduce the cost of the impregnant and to derive other valuable objectives, such as reducing the amount of polymer (thus reducing the attendant temperature rise during irradiation), the selected monomer may be "stretched" with a relatively "inert filler" additive, such as a suitable diluent or other compatible additive (e.g., silica). Certain specialized monomers, such as cross-linking monomers, grafting monomers or hydrophobic monomers may provide improved properties at relatively low concentrations, and thus be advantageous even when loaded into the wood is low percentages. Monomer combinations or co-polymers like styrene and acrylonitrile, should thus be considered, as well as the homopolymers described.

Any additive should also have a higher vapor pressure and, preferably, be less viscous than the monomer if possible. It appeared that a suitable substitute for MMA would be DAOP (diallyl orthopthalate); however, its dose requirements were much too high. Of course, workers in the art will understand that other functional additives such as water repellents, dyes, fungicides, odorants, bacteriostats, ultraviolet absorbers or the like may also be added to the impregnant mix where compatible. Additives may also be used to reduce heat of polymerization, radiation requirements and/or cost of impregnant as well. Certain plasticizers can be expected to give one or all of the foregoing advantages; for instance, sebacates, adipates, polychlorinated phenyls or phthalates (e.g., "Santicizer" series by Monsanto). However, surprisingly, it has been found that some plasticizers radically increase the amount of laking and thus are not suitable. For instance, a mixture of Santicizer 160 and Santicizer 141 (9:1) resulted in greatly increased laking. An activator may also be used, if compatible, to accelerate polymerization, but care is called for. For example, carbon tetrachloride is a good activator for MMA but could affect the wood (e.g., cause swelling).

In addition to the monomer constituent, aforementioned, it is typically desirable to add a fire-retardant to the impregnant, especially where the wood plastic composite is to be used in flooring or analogous combustion-prone applications. A known proprietary fire-retardant; "Phosgard" (an organic-phosphorus compound by Monsanto Co.) is an especially suitable retardant. Somewhat surprisingly it was found the presence of Phosgard also appears to reduce "laking" to some extent, when used in an optimum concentration range of about 10 percent (8–12 percent—see Example 1), and especially in company with an oil-soluble dye (See below).

Most surprisingly, it was found that oil-soluble dye additives, in rather small concentrations, could very significantly reduce laking. For example, we had seen that in impregnating red oak wood pieces of the aforedescribed type according to the aforedescribed treatment (90 percent MMA, 10 percent Phosgard) to obtain a "natural" wood finish, the amount of laking experienced was rather considerable. Eliminating the Phosgard did not reduce laking. However, most surprisingly, when the impregnant was modified to include an oil-soluble dye in a concentration of only a few percent, laking was radically reduced. For instance, adding a colorless dye additive soluble in the aforementioned formulation, practically eliminated laking with the "natural finish" (e.g. 1 percent Beta naphthol, 10 percent Phosgard, 89 percent MMA). Such a dye additive has been observed to render a fine neutral finish for WPC fillets as seen in EXAMPLE 1 below, with no troublesome laking. This was a surprising development and its theory is not, as yet, fully understood. Morever, this effect was observed in other than "neutral" or colorless impregnants. That is, with various stained ("colored ) impregnants, the degree of laking was likewise radically reduced simply through the addition of a few percent of suitable oilsoluble dye additives, as seen in the EXAMPLES. Some findings, although not conclusive, indicate that Phosgard (or equivalent) and the oil-base dye, together, reduce laking much more than either separately — i.e., a synergism is taking place. For instance, an impregnant with 10 percent Phosgard; 89.5 percent MMA and 0.5 percent dye (Amoplast Blue OAP) gave practically no laking (spacers also being used here); whereas, eliminating the Phosgard in the MMA gave heavy laking. Also using MMA alone was observed to lead to laking.

Thus, a preferred anti-laking impregnant formulation will include about 1 percent of an oil-soluble dye constituent, plus about 10 percent Phosgard and the remainder MMA (or less preferably, another suitable monomer selected from the group comprising vinyl type monomers; and styrene and/or acrylonitrile).

The following Examples illustrate the invention but should not be construed as limiting it.

EXAMPLE 1

Red Oak fillets of the type aforedescribed are impregnated according to the aforedescribed schedule (described relative to FIG. 3, etc.) with an impregnant comprising:

89% Methyl Methacrylate (MMA)
10% Phosgard
1% Beta Naphthol     concentrations by weight of impregnant The fillets are then irradiated as aforedescribed (relative to FIG. 4) for a total dose of 1.5 MRAD at 0.25 MRAD/hr. This renders a fine "Neutral" finish with relatively high yields and a significantly low incidence of "laking." An alternate oil-soluble, colorless dye will be suitable, such as Acetanilide, also at about 1 percent concentration.

EXAMPLE 2

In the impregnant formulation of Example 1 (89 MMA, 10 Phosgard), Beta Naphthol is replaced by about 1 percent of a dye mixture comprising: 90 parts "Orange Pel" plus 10 parts "Blue-Black." After irradiation, a finish with a golden brown color (styled as the "Americana" shade — a trade name of NUMEC) is rendered, with the same significantly low incidence of laking.

EXAMPLE 3

The impregnant formulation in Example 1 is repeated, substituting for Beta Naphthol (alone) about 1 percent of a mixture comprising: 7 parts BN (Beta Naphthol) and 1 part a dye mix comprising: 40 parts "Orange Pel-30" "Oil Brown" and 30 parts "Green Oz". After irradiation, a "gray-tan" finish (styled as the "Provincial" shade — a trade name of NUMEC) is rendered with the same low level of laking. However, deleting the Beta Naphthol was found to give about the same heavy laking as with the unmodified natural impregnant aforementioned (i.e., EXAMPLE 1 without Beta Naphthol).

EXAMPLE 4

The formulation of Example 1 is modified to comprise:

88.75% MMA
10.0% Phosgard
1.25% of a dye comprising: 40 parts "Orange Pel"–30 parts "Oil Brown"–30 parts "Green Oz."

After irradiation, a "dark brown" finish (styled the "Gothic" shade — a trade name of NUMEC) is rendered, exhibiting a similarly minor degree of laking.

It will be understood that the radio-induced polymerization of the foregoing Examples affords a number of advantages over thermal-catalytic techniques, such as: extending monomer pot life, avoiding the inhibitory inter-action of some wood resin with catalysts; avoiding the long curing times and elevated temperature typically associated with conventional polymerization; and avoiding the danger of premature or uncontrolled polymerization associated with catalysts and the attendant problem of catalyst residue in the polymer.

Of course, the foregoing Examples are understood as merely illustrative of preferred materials and other equivalent materials will be contemplated by those skilled in the art for similar applications. For instance, while thermoplastic vinyl monomers like the poly (methyl methacrylate) described were especially suitable, other like monomers may be appropriate for similar high energy radio-induced polymerization (as in the described 1–2 Megarad range with Cobalt-60). There are three general classes of thermoplastic monomers, (acrylics, modified styrenes and vinyls), to be primarily considered in wood-plastic production using a radiation source. Each class possesses distinct chemical and physical property advantages which are imparted to wood through the "in situ" polymerization of the monomer by radiation. The polymerized acrylics are well known for their strength and rigidity, weather ability and optical clarity; while the polystyrenes excel in toughness, chemical resistance, heat resistance and electrical properties. The vinyl family is noted for flexibility, chemical resistance, low moisture absorption and high dielectric qualities, as well as for strength and toughness.

Likewise, other compatible dyes, reasonably soluble in the selected monomer, may be suitable. Equivalent fire-retardant material will also be employed where suitable and will be expected to preferably have a molecular structure similar to the aforementioned Phosgard, which is a rather large, complex long-chain molecule (including phosphorus and chlorine for fire-retardancy), having a structure like the following:

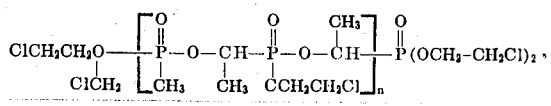

In testing finishes according to the above four Examples for fading, against an undyed, untreated "control finish," it was found that, where the "controlled" yellowed pronouncedly after about 20 hours of light exposure, the finish of Ex. 1 yellowed much less even after 80 hours; the finishes of Ex. 2 and Ex. 3 yellowed somewhat less after 40 hours, fading somewhat after 80 hours; while that of Ex. 4 faded slightly after over 80 hours exposure, taking on a "greenish" cast after 20 hours, then a "blueish" cast after 80 hours.

In a similar "weathering" test (adding a water spray to the light exposure), as compared to the fade test, the "Control finish" and the finish of Ex. 1 both yellowed much less over 40 hours exposure; that of Ex. 2 faded more after 20 hours, and much more after 40 hours; while the finishes of Ex. 3 and Ex. 4 faded slightly over 40 hours, with that of Ex. 3 turning slightly green.

Other dyes which are oil-soluble will be understood by those skilled in the art as suitable and may well reduce laking also. Some of these are listed in Table I below, together with the solvent in which their solubility appears satisfactory (solvent code is; "M:" straight methyl methacrylate, MMA; "M-B:" MMA/Benzene in 50/50 ratio; "M-A:" MMA/Acetone 50/50; and "M-B-A:" MMA/Benzene/Acetone 50/25/25; whereas LR indicated that tests showed that this dye reduced laking):

TABLE I

| | | | | |
|---|---|---|---|---|
| Isol Black | M | M–B | M–A | LR |
| Isol Red | M | | | LR |
| Isol Yellow | M | | | |
| Brill. Oil Blue (BMA) | M | M–B | M–A | LR |
| Oil Yellow-3G | M | | | |
| Plastic Green B | M | | M–A | LR |
| Spirit Soluble Fast Yellow (3G) | | | M–A | |

TABLE I—Continued

| | | | |
|---|---|---|---|
| Spirit Soluble Fast Yellow (TX) | | M–A | |
| Solvinac Golden Yellow | | M–A | |
| Chrosoidine Y Base | M | M–A | LR |
| Plasto Y Yellow | | M–A   M–B–A | |
| Oil Brown Y | M | M–A | |
| Solvinac Black | | M–A | |
| Oil Black Bt | | M–B–A | LR |
| Oil Red GTE | | M–B–A | |
| Plastic Violet MR | | M–B–A | |
| Solvinac Yellow GA | | M–B–A | |
| Oil Brown "54392" | M | | LR |
| Amaplast Red AAP | M | | LR |
| Amaplast Green ON | M | | LR |
| Amaplast Blue OAP | M | | LR |
| Oil Orange Pel | M | | LR |
| Oil Green Keco, RZZ | M | | LR |

(Note: absence of code indicia is not necessarily meaningful!)

TREATING IMPROVEMENTS

To reduce laking, various processing expedients were tried. One was the introduction of separators between fillet layers in the impregnant magazine (cf. Layers L-1, etc. of stack S in FIG. 3). Separators in the form of various thicknesses of cardboard and masking tape were found quite ineffective. Surprisingly, however, the use of metal spacer rods did reduce laking significantly. For instance, pairs of 1/16 inches stainless steel rods R ("welding rods"), as indicated for stack S in FIG. 3, were effective in the aforedescribed impregnation and irradiation treatments. These separators were not necessary where the stack was only a few layers high (e.g., up to about 10–15).

Further, no separation means appeared to affect laking in the bottom few layers (e.g., in a 24-layer stack, only the bottom-most layer was heavily laked in every cycle). Thus, it was found advantageous to leave a few bottom ("dummy") layers in the magazine from one impregnation cycle to the next i.e., at least one such layer, stacking on top thereof and not unloading it). Alternate expedients, such as an apertured false bottom (one or two layers high, to catch dripping monomer) or the like, may be contemplated.

One aggravating problem associated with irradiation is "polymer build-up" on the canister inner walls and the "can-cleanup" operation that it periodically necessitates. This clean-up is very difficult and time consuming because the polymeric coating involved is strongly adherent and very tough. According to a feature of this teaching, we have found it possible to virtually eliminate this problem by providing a "catch cavity" in the bottom of the irradiation canister and spreading a suitable inert absorbing material in this cavity. Canister 30 in FIG. 4 illustrates such a cavity CV, between the pair of lower guide rails gr. A very satisfactory absorbent for cavity CV is "Florco-X" (by Floridin Co.). Sufficient absorbent should be spread to "catch" and absorb virtually all the effluent monomer expected (e.g., Florco-X absorbs about 1 gm. for each gm. thereof). Apparently the polymer coating derives from monomer condensing on the canister walls, dripping down to the bottom and polymerizing there, since this cavity with the absorbent material alleviates the buildup and cleanup very significantly.

FINISHING

The impregnated, irradiated wood should be surface-finished to remove impregnant-depleted surface layers, as well as to establish a flat, smooth finish at the desired fillet thickness. For Red Oak fillets, treated as aforedescribed and assembled into panels (as in FIG. 2) thereafter, this will typically involve cutting away about 20–30 mils (or more, where surface deviations require; however, this treatment, fortunately, penetrates so deeply that deep-cutting does no harm. This cutting, for example, may be according to the following schedule, in Table II:

TABLE II

| | |
|---|---|
| A – Rough Trim | with a triple-headed "Timesaver No. 730-3" (240/130 Hp. drive) Sander, having sandpaper heads at No. 60, No. 80 and No. 126 grit sizes and traveling at about three thousand ft/min (it is important to keep under 5000 fpm), with the work fed at about 15–38 fpm. Acting as an abrasive planer, this machine establishes fillet thickness (e.g. at 5/16"); As a less preferable alternative, one may use a "Yates American Sander" with heads of No. 50, No. 60 and No. 100 grits, moving at about three thousand fpm (25–30 No. on the "drag gauge"); |
| B – Fine Trim | with a "Timesaver" Sander like the above (but less horsepower and only two heads, at No. 150 and No. 240 grit sizes), the sanding marks from step A are obliterated; |
| C – Polish | with a pair of polishing wheels, the now-trimmed surfaces are successively "paste-polished" (with a compound) and "dry-polished" to smooth and polish them. Especially satisfactory results have been achieved using a pair of "Clair Compact" buffers (Clair Manufacturing Co., 24" thru-feed) with the buffing wheels moving at about four thousand fpm and the work surface lightly biased against the wheels. A less favored alternate to this step comprises a very fine sanding, such as with one or more "Timesaver" heads, with grits in the Nos. 240–300 size range; |
| D – Buff-Wipe | as a final polish and especially to brighten the surface and pick up all traces of surface debris, (such as "polymer dust" from the preceeding steps, or any film), a "buff-wipe" is performed on a buffing wheel using a wiping compound, such as a "Tripoli compound", (fine abrasive suspended in tallow base). For this, a high speed "sailcloth" wheel (at about three thousand fpm, with light work-pressure in preferred). |

TABLE II—Continued

An oil wipe was tried, but found to leave an undesirable film residue. Other equivalent techniques may be employed for this step, such as a polishing with "Scotch-Brite" (by Minnesota Mining and Manufacturing Co.) buffing pads having a dressing impregnant (though these were observed to wear out relatvely quickly).

This final buff-wipe is very important although this was not at first appreciated. It appears that any of the conventional finishing steps either leave a residue on the WPC surface or render it apt to generate such a residue during service. For instance, on a number of test installations, a final ultra-fine sanding and/or cleaning left the WTC flooring surface with a rather "dull" surface-finish not long after installation. This was not cured by repeated washings and/or polishings or sanding.

It is theorized, but not certainly known, that a "buff-wipe" like the aforedescribed serves to pick up tiny polymer dust or other residue that acts to scatter reflected light and generally destroy surface "sheen".

Where the foregoing finishing schedule was quite suitable for post-irradiation assembled panels (e.g., as in FIG. 2), a simplified schedule was found satisfactory for finishing "pre-assembled" tiles, of the type aforementioned in connection with FIG. 1. For these, it was discovered that steps A and B of Table II may be omitted and only steps C and D employed.

It has been found very important to sand with (not against, or across) the fillet grain if possible. This was surprising since it, at first, appeared desirable to sand against the grain; for instance, so as to minimize "polymer liftout." However, this was found to leave scratches that were extremely noticeable and virtually impossible to buff away or disguise. However, such scratches are not apparent when sanding with the grain. Of course, this is not practically possible with an embodiment like that of FIG. 2. It will also be important to renew sander belts before they are degraded (e.g., by "polymer build-up") to the point where they can scratch or mar the wood finish.

Workers in the art will appreciate that in certain cases, the aforedescribed sanding operations may be replaced with other surface treatments for finishing a WPC surface. For instance, it will at times be practically feasilble to eliminate the aforementioned "surface depletion," such as by reducing impregnant evaporation to an insignificant amount during treatment and/or by impregnating and polymerizing the depleted surface areas in a second impregnation-polymerization cycle (following that for filling the body of the material). However, even with the depleted surface layer substantially eliminated, it may be desirable in certain cases to provide the WPC surface with a "finish" to provide a smooth, glossy appearance, or seal the surface (such as against intrusion of water, dirt or the like), or for some other purpose. This may be affected by such known techniques as dissolving a portion of the surface polymer in a suitable solvent and then letting it dry to the desired finish; melting the surface polymer with a heat treatment, using such expedients as an oven, an infrared lamp, inductive heating, surface flaming or the like. The WPC surface, whether depleted or not, may also be impregnated with a sealing finish, such as a sealing coat of hot wax.

Workers in the wood products arts will visualize many applications for wood surfaces treated in the foregoing manner, whether or not the pieces are treated in fillet or tile form. For example, they may be employed for specialty flooring and other building components (e.g., doors, window sashes, handrails); or for furniture parts (e.g., desk tops, chair seats); or for industrial components (e.g., textile bobbins, patterns and jigs); or for sporting goods (e.g., gun stocks, golf clubs, bowling pins, boats); or for toys and school supplies; or for specialty items such as tools, handles (cutlery), wooden ware, and the like. Wood so treated will in general be harder, denser and more durable than ordinary wood, depending on the percent polymer loading; and will compare very favorably as to the properties of: static bending, sheer, flame retarding, (apparent) dimensional stability, decay resistance, compressive strength, weather-ability, "machineability", and aesthetic appearance. However, it may be less satisfactory as to "nail-ability" and impact resistance, Surface finishing will be especially facilitated and the need for maintenance and refinishing, will be dramatically reduced. Thus, if a WPC finish is marred or otherwise deteriorated, it may easily be restored with a light sanding or buffing, since the polymer is present "in-depth."

While preferred embodiments have been disclosed herein, many modifications and substitutions are feasible, as understood by those skilled in the art. Thus, it will be understood that the invention is not to be construed as limited to the disclosed subject matter except insofar as is dictated by the present state of the art, but limited only by the appended claims.

What is claimed is:

1. A process for treating wood articles in the fabrication of wood-plastic flooring tiles wherein polymerization of the impregnant is induced by high-yield irradiation, the improvement comprising:

assembling rectangular tiles comprising fillets of a hardwood containing a measurable proportion of from about 5 to about 10 percent moisture;

impregnating the thus assembled tiles with a suitable impregnant comprising a monomer having a polymerizable unsaturated group and a quantity of halo-organophosphorous composition imparting flame retardancy to the flooring tiles, said combination of monomer and halo-organophosphorous composition having a synergistic effect upon preventing the occlusion of portions of the impregnant or laking on the surfaces of the assembled floor tile;

arranging the floor tiles and irradiating them by exposure to a Cobalt-60 source for on the order of about 1 or 2 megarads radiation dosage at a rate of about a fraction of a megarad per hour whereby said monomer is polymerized with no significant laking or other significant yield losses; and finishing prescribed finish-surfaces of the articles by abrading and polishing these surfaces to a prescribed depth, sufficient to remove impregnant-deficient material, said finishing comprising sanding said fillets by multiple application of sanding heads transported at the effective rate of a few thousand feet per minute, the so-abraded surfaces being thereafter wiped to remove dulling residues.

2. The process of claim 1 in which methyl methacrylate is at least a significant portion of the monomer.

3. The product of the method as recited in claim 2. with

4. The method as recited in claim 1 wherein said wiping comprises buffing said surfaces with a prescribed buffing wheel, the articles being also coated wtih a prescribed pick-up compound to effect and enhance this buffing.

5. The combination as recited in claim 1 wherein said sanding is affected by heads with grit sizes on the order of 80–120–240, respectively; and wherein said buffing is affected by a sailcloth buffing wheel moving at a few thousand feet per minute, slightly biased against the work.

* * * * *